Sept. 16, 1924.

C. JACKSON 1,508,974

AUTOMATIC MULTIPLE SPINDLE MACHINE TOOL

Filed July 30, 1921    8 Sheets-Sheet 1

Inventor
Calvin Jackson.

By Emery, Booth, Janney & Varney
his Attorneys

Inventor
Calvin Jackson.

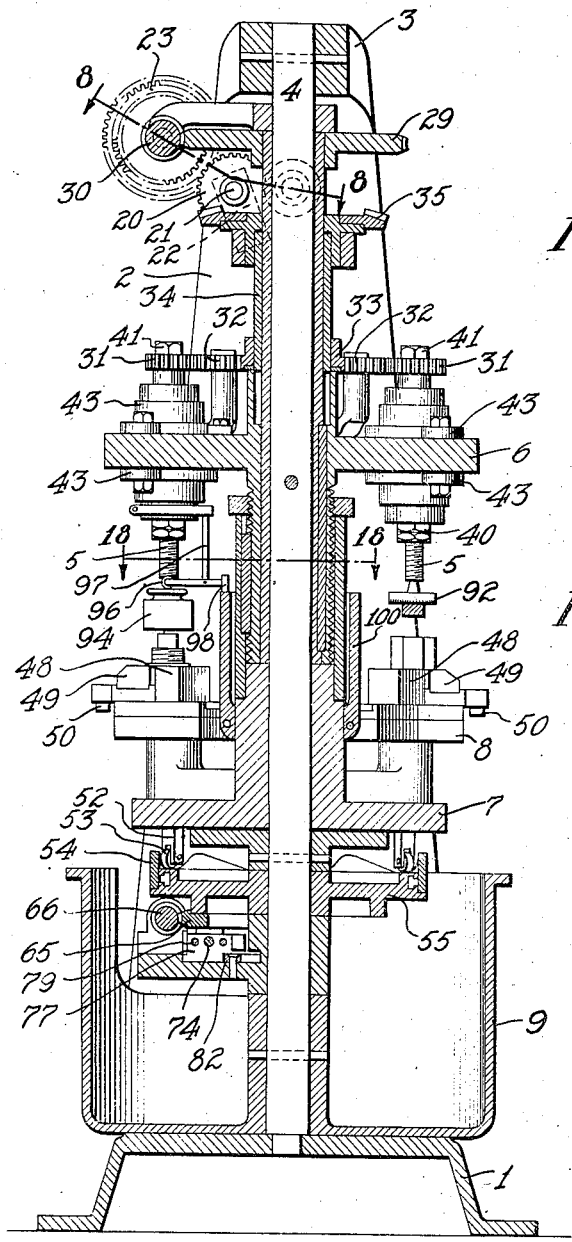
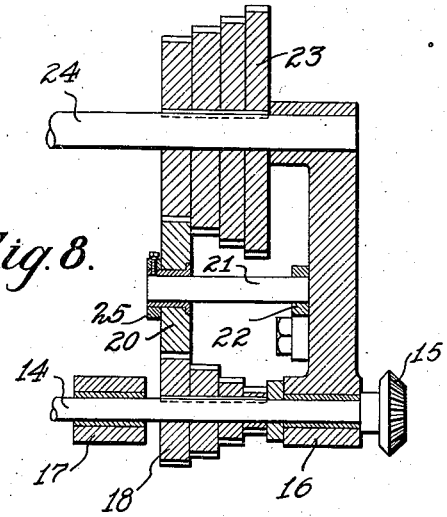
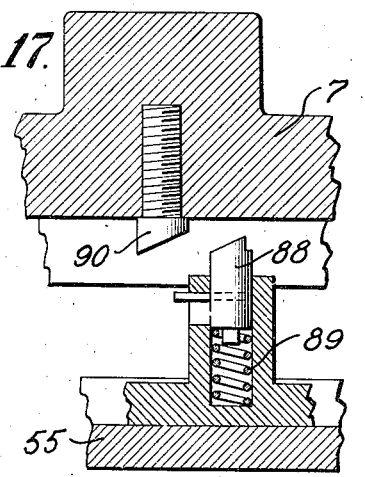
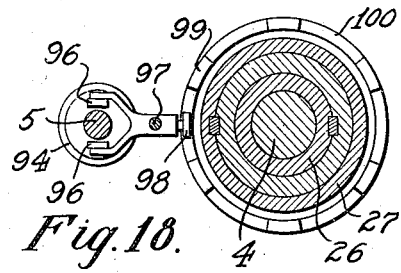

Sept. 16, 1924.                                                    1,508,974
C. JACKSON
AUTOMATIC MULTIPLE SPINDLE MACHINE TOOL
Filed July 30, 1921         8 Sheets-Sheet 6
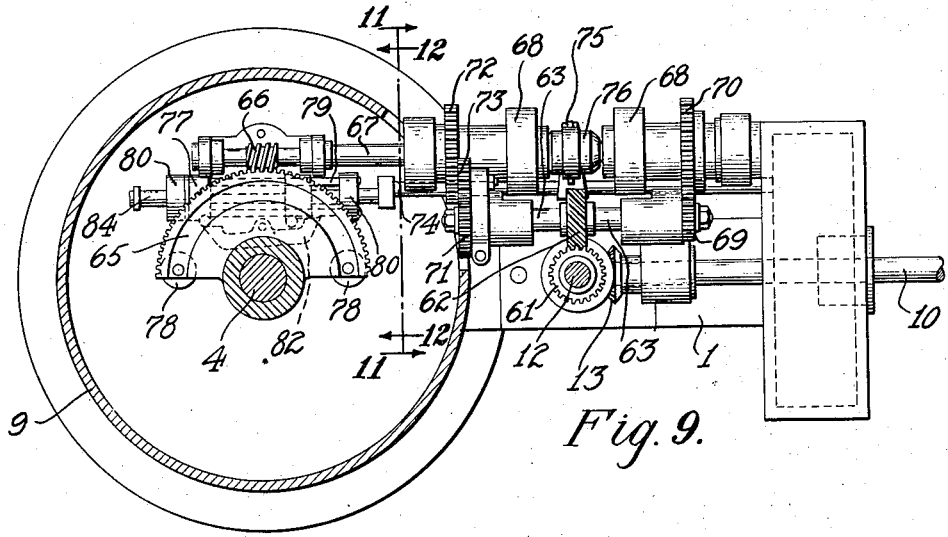
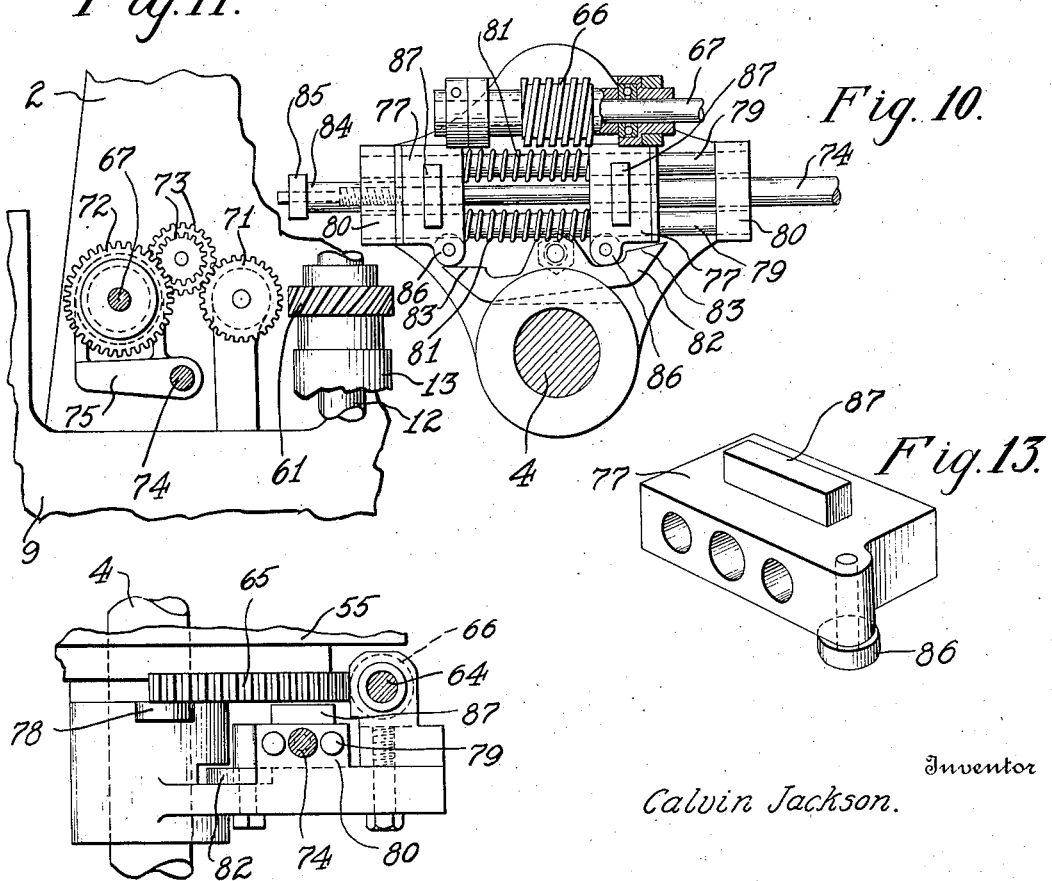
Inventor
Calvin Jackson.
By Emery, Booth, Janney & Varney
his Attorneys Sept. 16, 1924.

C. JACKSON 1,508,974

AUTOMATIC MULTIPLE SPINDLE MACHINE TOOL

Filed July 30, 1921    8 Sheets-Sheet 7

Inventor
Calvin Jackson.

By Emery, Booth, Janney & Varney
his Attorneys

Sept. 16, 1924.

C. JACKSON 1,508,974

AUTOMATIC MULTIPLE SPINDLE MACHINE TOOL

Filed July 30, 1921    8 Sheets-Sheet 8

B

C

D

E

F

Inventor
Calvin Jackson.

By Emery, Booth, Janney & Varney
his Attorneys

Patented Sept. 16, 1924.

1,508,974

UNITED STATES PATENT OFFICE.

CALVIN JACKSON, OF JACKSONWALT, PENNSYLVANIA, ASSIGNOR, BY MESNE ASSIGNMENTS, TO READING AUTOMATIC MACHINE COMPANY, A CORPORATION OF PENNSYLVANIA.

AUTOMATIC MULTIPLE-SPINDLE-MACHINE TOOL.

Application filed July 30, 1921. Serial No. 488,738.

*To all whom it may concern:*

Be it known that CALVIN JACKSON, a citizen of the United States, residing at Jacksonwalt, Berks County, Pennsylvania (whose post-office address is Third and Buttonwood Streets, Reading, Pa.), has invented an Improvement in Automatic Multiple-Spindle-Machine Tools, of which the following description, in connection with the accompanying drawings, is a specification, like characters on the drawings representing like parts.

This invention relates to machines for performing in rapid succession one or more operations, such as drilling, counterboring, tapping, threading, die cutting and the like, on a large number of work pieces of the same shape.

The invention aims to improve the construction and increase the output of such machines, and among its objects are great rapidity of operation and adaptability for handling a wide variety of work, simplicity of construction and ease of adjusting or renewing tools, change speed gears, cams and other parts of the machine subject to wear or required to be changed to suit any special work.

The invention further aims to adapt a machine of this character to operate either as a successively or as a continuously operating machine, depending upon the kind of work to be done, and to improve the spindle driving means and work holding and feeding means to meet the needs of either method of operation.

Further aims, objects and advantages of the invention appear in connection with the following description of a preferred form of machine illustrating the invention and shown in the accompanying drawings.

In the drawings, Fig. 1 is a side elevation of a vertical six spindle drilling and tapping machine having six work holders, showing it arranged for continuous operation;

Figure 3:
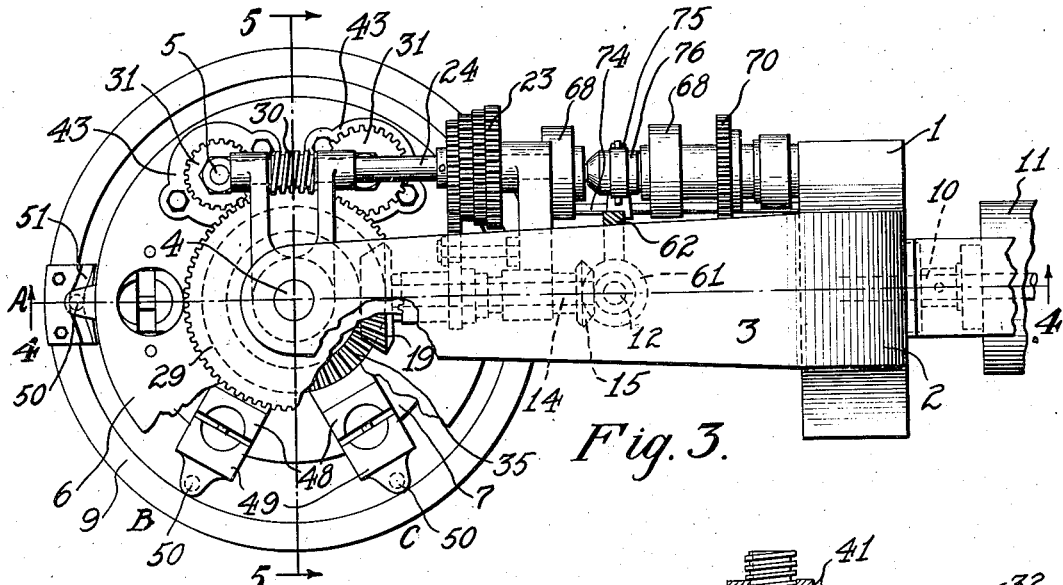
Fig. 3 is a top plan view (drawn to a large scale) of the same, showing the machine arranged for intermittent operation.
Figure 4:
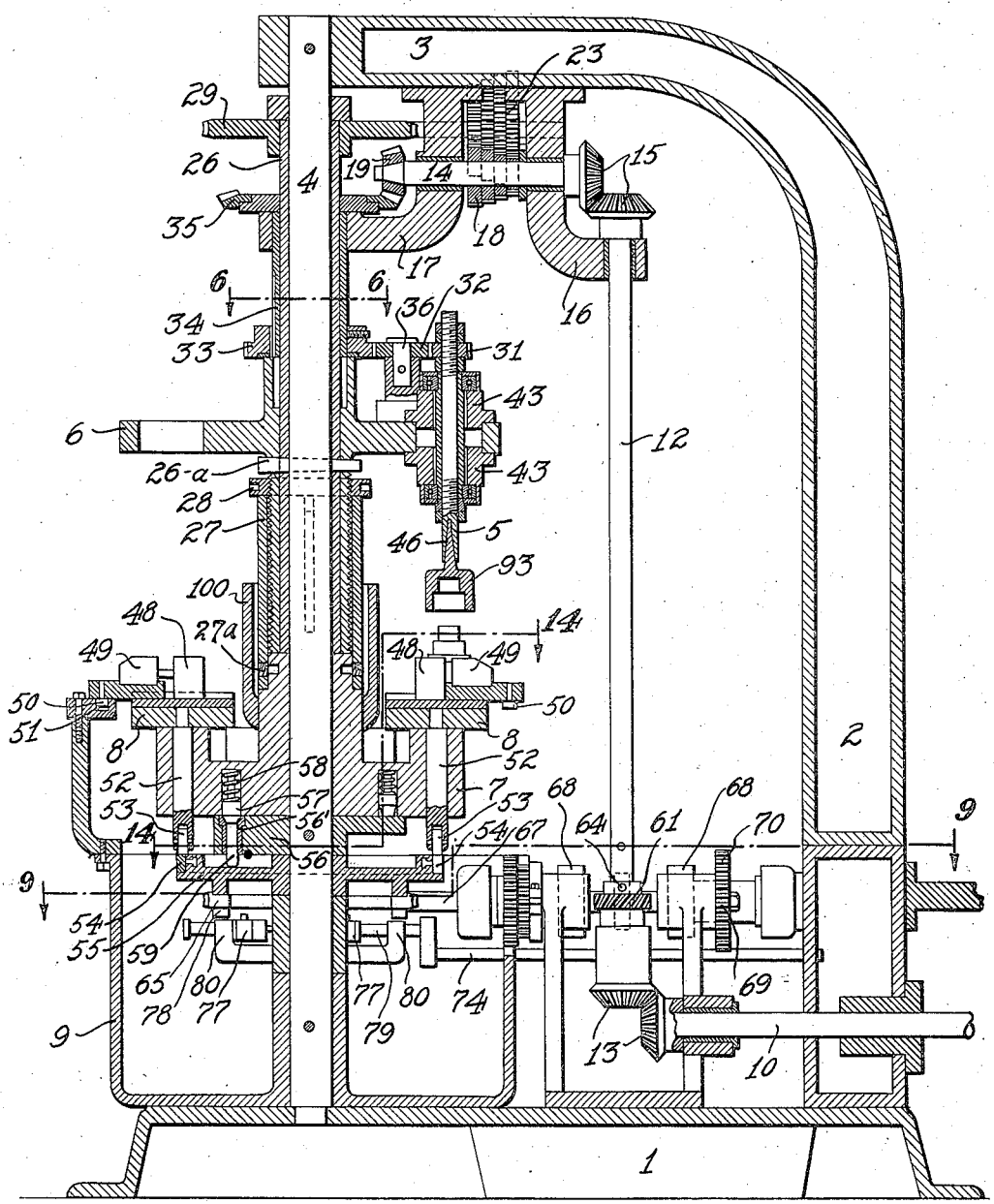

Figs. 4 and 5 are vertical central cross-sections on the lines 4—4 and 5—5, respectively, in Fig. 3;

Fig. 6 is a horizontal cross-section on the line 6—6 in Fig. 4, showing the changeable driving gears for the tool spindles in plan view;

Fig. 7 is an axial section on the line 7—7 in Fig. 6, drawn to a larger scale;

Fig. 8 is a cross-section on the line 8—8 in Fig. 5, showing the gear cones and means for varying the rotating speed of the spindle housing plate and work holder support when the machine is arranged for continuous operation;

Fig. 9 is a horizontal cross-section on the line 9—9 in Fig. 4, showing the driving and reversing mechanism for the feed cam plate;

Fig. 10 is a plan view of the reversing mechanism and bracket for supporting it;

Figs. 11 and 12 are cross-sections of the same on the lines 11—11 and 12—12 in Fig. 9, looking in the direction of the arrows, respectively;

Figure 14:
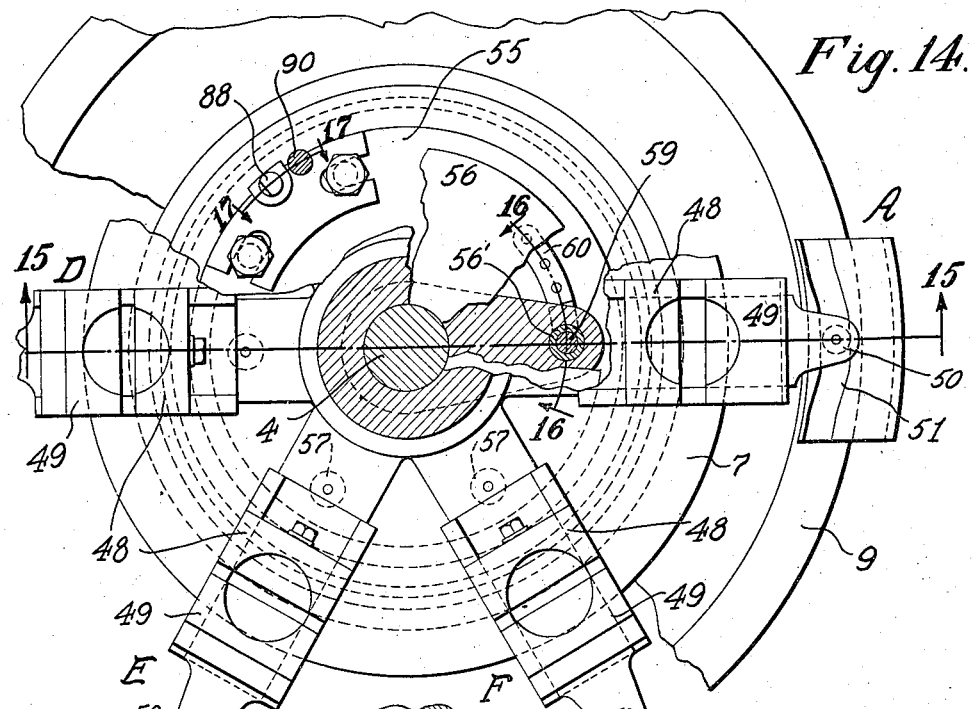
Figure 15:
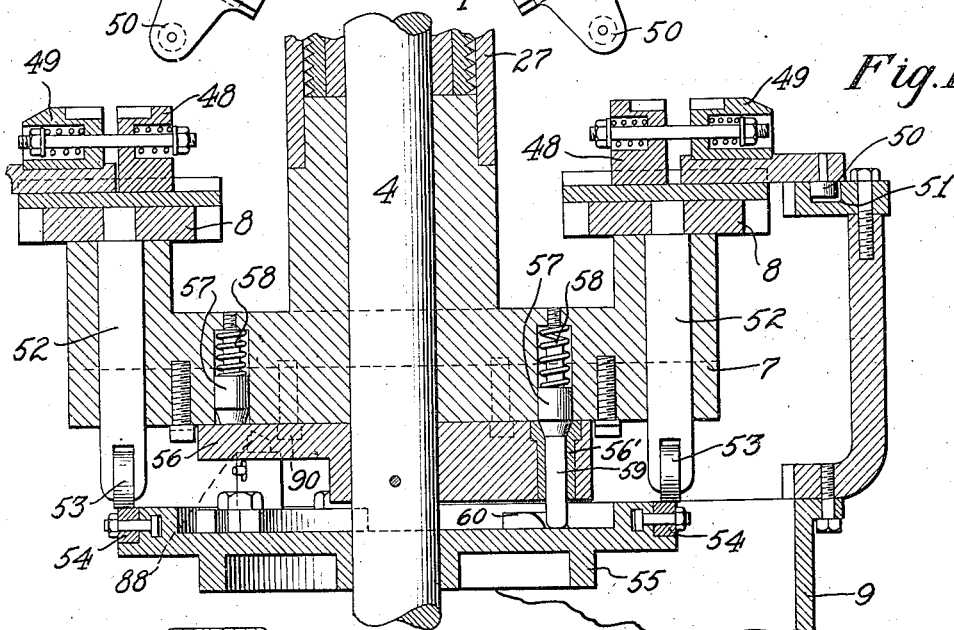
Figure 16:
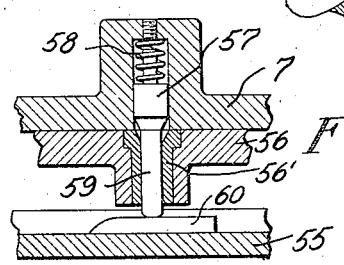
Figure 19:
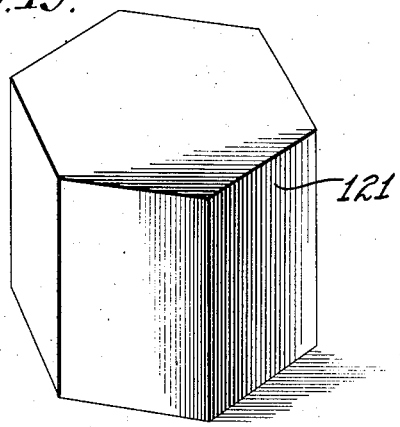
Figure 20:
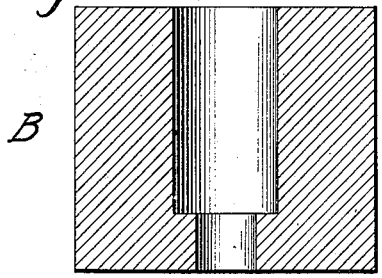
Figure 21:
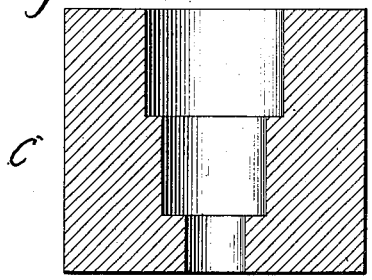

Fig. 13 is a perspective view of a reversing dog;

Fig. 14 is a horizontal cross-section on the line 14—14 in Fig. 4, showing the table for the work holders partly broken away to disclose the indexing plunger and turning pin;

Fig. 15 is a vertical axial section of the same on the line 15—15 in Fig. 14;

Figs. 16 and 17 are cross-sections of the turning pin and locking plunger on the lines 16—16, and 17—17 in Fig. 14, respectively;

Fig. 18 is a cross-section on the line 18—18 in Fig. 5;

Figs. 19 to 25, inclusive, are views illustrating the successive stages of operations in the production of a plug or valve body by the machine.

Figure 1:
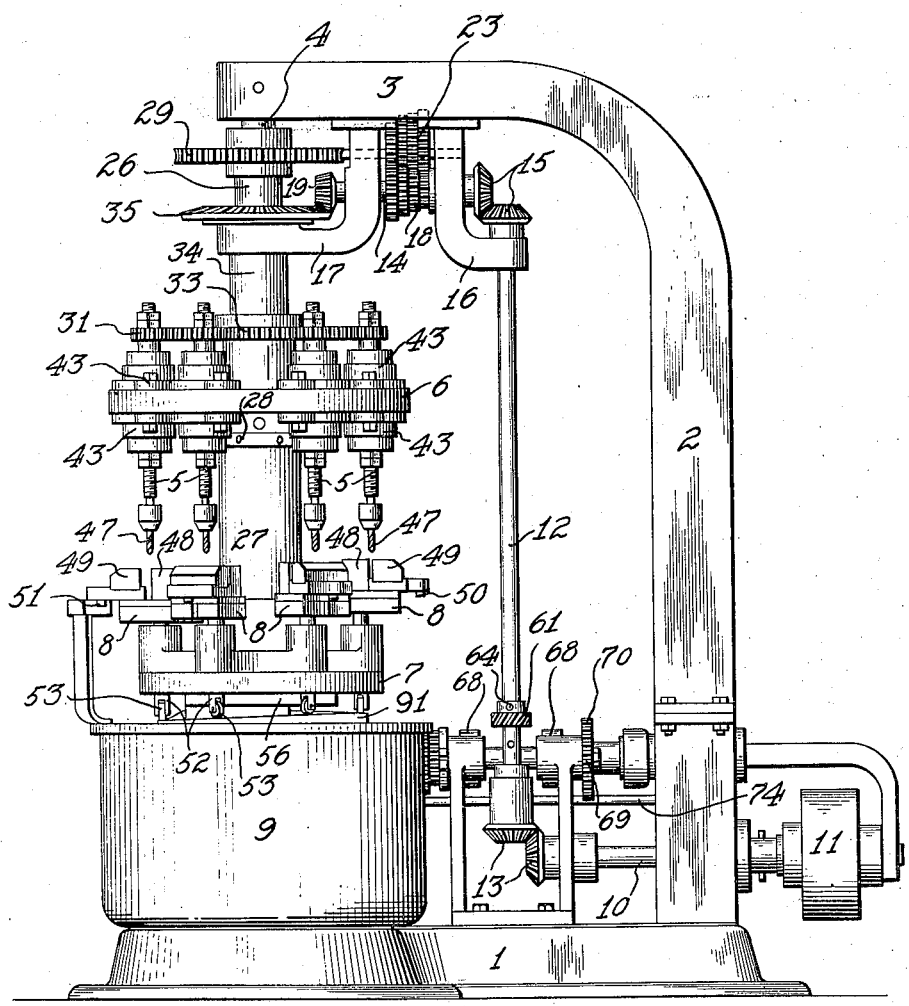

Figs. 2 to 18, inclusive, show the machine arranged and equipped for performing the successive operations illustrated in Figs. 20 to 25, the general arrangement of the machine being as shown in Fig. 1.

The typical machine illustrated in the drawings is adapted to be operated either continuously or intermittently, depending upon the nature of the work to be performed. If there is only one operation necessary, each tool spindle will have the same kind of a tool, and the tool carrying head and the table for the work holders will revolve in unison without stopping, the tools rotating continuously, thereby increasing the number of pieces that can be turned out per hour; whereas if a series of different operations is required the tool spindles and head remain stationary and the work holder table is revolved step by step to bring the work to the successive operating positions.

Figure 1 shows the machine set up for continuous operation, the tools being drills arranged for simultaneously drilling one or more holes in each work piece as the drills and work pieces revolve around the center post of the machine.

Figures 2 to 18, inclusive, show the machine set up for performing a series of operations, for example, drilling, facing, counterboring, hollow milling, die threading, and tapping, the successive operations being performed intermittently at different positions around the center post by fixed tools while the work holder table is momentarily stationary, the table being indexed by automatic means between each working period.

*General description.*

The general features of construction are the same whether the machine be arranged for continuous operation or for intermittent or indexing operation. It is mounted upon a substantial base 1, having a pillar 2 at one end with an overhanging arm 3 (see Fig. 4) for holding the upper end of the center column 4 and for supporting the driving and operating gears for the tool spindles 5 and spindle head 6. The lower end of the center column is securely held in the base and carries the rotatable table 7 for the work holders 8 which are slidable up and down therein. The lower end of the center column is surrounded by an oil pan 9 bolted or otherwise secured upon the base and forming a support for some of the attachments used with the machine.

The tool spindles are rotated and the work holders are raised and lowered to feed the work to the tools by suitable gearing from a main driving shaft 10 driven by a pulley 11 (see Fig. 1) or other means, such as an electric motor. The main shaft drives a vertical shaft 12 through suitable gearing, such as the bevel gears 13 (shown in Figs. 1 and 4), which in turn drives the upper driving shaft 14 through bevel gears 15 or other suitable means. The upper driving shaft is journaled in brackets 16, 17, carried by the arm 4, and is fitted with a gear cone 18 for revolving the spindle head 6 and work holder table 7 at the desired speed and a bevel gear 19 or other suitable means for rotating the tool spindles.

When the machine is arranged for continuous operation an idler gear 20 (see Figs. 5 and 8) carried by an adjustable stud 21 bolted to an arm 22 on the bracket 16 is interposed between one of the gears of the cone 18 and the corresponding gear of a mating cone 23 on the side shaft 24. The idler gear 20 is journaled on a bushing 25, which can be secured by a set screw in any desired position on the stud 21 to connect any pair of gears, according to the speed of revolution desired for the work holder table and the tool spindle head. The tool spindle head is splined upon a driving sleeve 26 so that it may be adjusted up and down by means of a supporting sleeve 27 and adjusting nut 28 (see Figs. 4 and 5). The driving sleeve has a worm wheel 29 on its upper end which is driven from the side shaft 24 by means of a worm 30.

The taper pin 26$^a$ which secures the tool spindle head to the center column when the machine is arranged for intermittent operation is removed when the machine is arranged for continuous operation, and screws 27$^a$ are set to hold the spindle head and work holder table together. These screws are taken out when the machine is arranged to be operated intermittently.

*Tool spindle drive.*

The tool spindles may be rotated at any speed desired by means of the changeable gears 31 splined upon their upper ends (as shown in Figs. 6 and 7) which in turn are driven through the changeable and adjustable idler gear 32 from the large gear 33 splined on the sleeve 34 journaled in the extremity of the arm 17. The sleeve 34 has a bevel gear 35 on its upper end whereby it is rotated from the bevel gear 19 on the shaft 14. (See Fig. 4.) The changeable idlers 32 are mounted on studs 36 which are adjustably held on the tool spindle head by means of screws 37 passing through slots 38$^a$ in the bases of the arms 38 supporting the studs. The slots 38$^a$ are long enough to permit a range of adjustment sufficient to accommodate all the sizes of idlers needed.

The tool spindles are mounted in bearing sleeves 39 within which they are slidable up and down to adjust for various lengths of tools and for wear. They are adjusted and securely locked in the sleeves by turning the lock nuts 40, 41, on each spindle, as shown in Fig. 7. The bearings 42 for the bearing sleeves 39 are mounted in supports 43 that are bolted to the tool spindle head, so as to be readily removable. The bearings are held in place by screw rings 44, 45, so as to be accessible and easily removed if necessary. The tool spindles 5 have taper sockets 46 at their lower ends to receive the shanks of the drills 47 or other tools for which the machine is adapted. The adjustment of the tool spindles and their driving gears is not affected by changing the machine from continued to intermittent operation, and vice versa.

Work holders and operating means.

Figure 2:
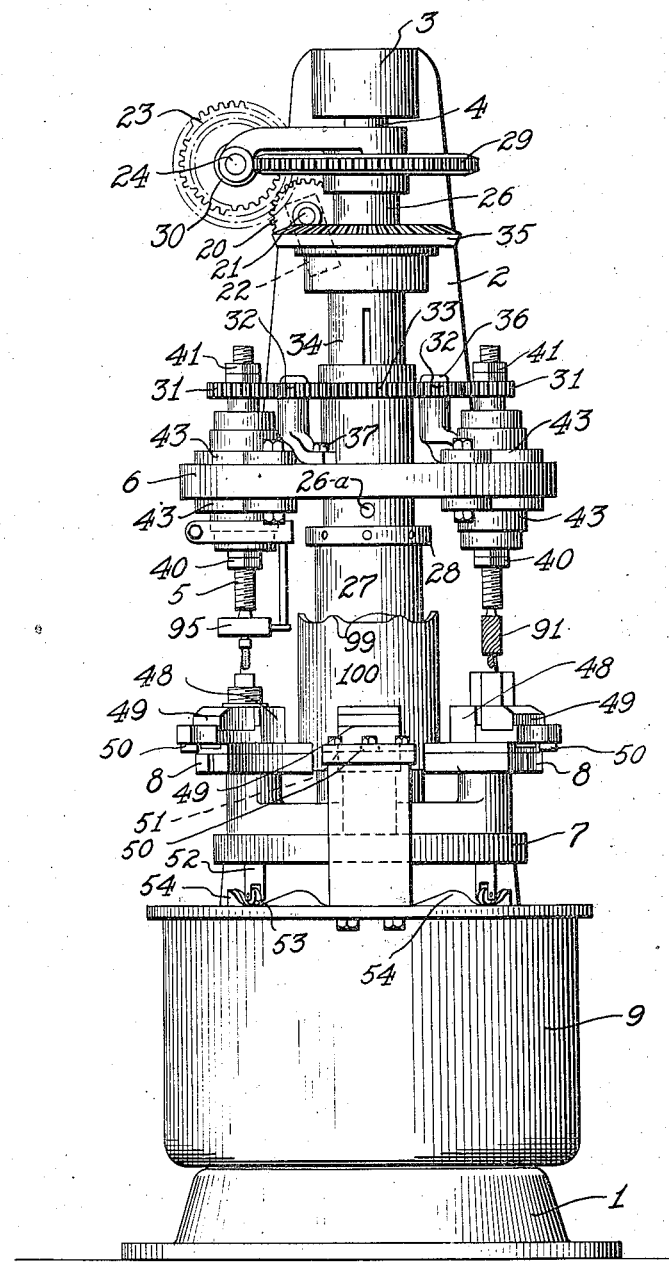
Fig. 2 is a front elevation.

The work pieces are held in any suitable manner, such as in clamps or vises mounted on the work holders 8. Preferably the work pieces are held each in a suitable vise or chuck mounted on each work holder 8 and having automatic means for opening it to permit the work to be changed at the feeding position. The chuck shown in the drawings (see Figs. 14 and 15) has a fixed jaw 48, and a movable spring closed jaw 49 slidably mounted on the work holder 8. The movable jaw has a roller 50 on its outer end to engage a cam groove 51 secured to the base of the machine at the feeding station, as shown in Figs. 1, 2 and 3. Referring particularly to Figs. 4 and 5, the stems 52 of the work holders are preferably square and fit in square holes in the work holder table 7. The lower ends of the stems 52 extend through the work holder table 7 and have rollers 53 on their lower ends which roll on the cam sections 54 on the cam plate 55 to lift them periodically to feed the work against the tools.

Indexing and feeding mechanism.

The work holder table 7 is supported on an index plate 56, keyed or pinned to the center column 4 so as to be stationary. The index plate has a socket 56' into which the index plungers 57 drop successively when the machine is arranged for intermittent operation. These index plungers are inserted in spaced holes in the under side of the work holder table, one for each work holder, and are held against the index plate by springs 58. A plunger pin 59, slidably held in the bushing 56' elevates the plungers to release the work table when the cam 60 on the cam plate 55 passes under it. For continuous operation the plunger pins are held in their raised position by the cam 60, as the cam plate does not oscillate when the machine is operating continuously.

During intermittent operation of the machine the cam plate 55 is caused to oscillate around the center post, first to the right (as seen in Figs. 2 and 12) to index the work holder table, and then to the left to cause the cams 54 to pass under the rollers 53 on the stems of the work holders to raise them to feed the work against the tools. These cams are separate from each other so as to be independently removable and adjustable and are secured to the cam plate by any suitable means such as T-bolts (see Fig. 15).

The mechanism for indexing the table and lifting and lowering the work holders to feed the work toward the tools in the successive operating positions is shown in Figs. 4, 5, 9 and 11 to 18, inclusive, and is operated from the vertical power shaft 12 by means of a spiral gear 61 that is arranged on the shaft 12 to be thrown into or out of engagement with a gear 62 on the side shaft 63. The gear 61 may be secured in position in any suitable way, such as by the taper pin 64. In Fig. 1 the gears 61 and 62 are shown out of engagement for operating the machine continuously and in Figs. 4 and 11 they are shown in engagement for operating the machine intermittently.

The cam plate 55 has a worm sector 65 that is in engagement with a worm 66 on a reversing shaft 67 that is driven first in one direction and then in the other by means of clutches 68 from the side shaft 63. One clutch connects with the shaft 63 through the gears 69 and 70, and the other connects through the gears 71 and 72 and idler gears 73, as shown in Fig. 11. The clutches 68 are actuated in alternation by the shifter rod 74 operating through a yoke 75 and a double cone 76 slidably mounted on the reversing shaft 67. The shifter rod is thrown to operate the clutches at the end of each oscillatory movement of the cam plate by means of one or the other of a pair of slide blocks 77 that are engaged by one or the other of the rollers 78 on the underside of the worm sector (see Figs. 9 and 12).

Referring particularly to Figs. 12 and 13, the slide blocks 77 are mounted on side bars 79 and are limited in their movement by the end stops 80. The portion of the shifter rod that goes through the slide blocks is shouldered down so the blocks can slide towards one another on the rod, but they are held apart by springs 81. The slide blocks are held in one or the other of their extreme positions, to control and insure the proper movement of the clutches, by means of an escapement lever 82 which holds the blocks and clutches stationary until the movement of one or the other roller 78 has carried the corresponding slide block 77 past the dwell position 83 of the lever and thus permitted the lever to move and unlock the other slide block, whereupon the spring 81 throws the second block 77 as far as necessary to reverse the clutches. The length of the shifter rod may be adjusted to suit the clutches by means of the sleeve 84 and lock nut 85.

The right hand swing of each oscillation of the sector and cam plate causes the work holder table to rotate one step at a time, and its left hand swing raises the work against the tools. The cam plate carries a vertically slidable pin 88 normally held in its uppermost position by a spring 89 to engage the pin 90 on the under side of the work holder table, as shown in Figs. 14 to 17. The pin 88 snaps under the end of the pin 90 at the end of the left hand swing of the cam plate, and upon the cam plate reversing its motion and swinging in the right hand direction the pins 88 and 90 engage to rotate the work holder table one space to the right. The index plunger 57 is disengaged at the end of the left hand swing of the cam plate by the cam 60 riding under the plunger lifting pin 59 (see Fig. 16) and raising it flush with the top surface of the index plate 56 and thereby unlocking the index plunger to permit rotation of the work holder table when the cam plate reverses its movement and the pin 90 engages the pin 88.

When the machine is operating continuously the cam plate is held stationary by the engagement of its worm sector with the worm 66 in such position that the cam 60 is under the lifting pin 59 to hold the latter in raised position, thereby preventing the index plungers 57 from dropping into the bushing 56 as they revolve with the work holder table.

*Special tools and equipment.*

For the continuous operation of the machine to perform a single operation the cam plate is fitted with cam segments 91 forming a continuous cam path gradually rising from the feeding position (shown in the right in Fig. 1) to the last working position (shown at the left in Fig. 2). For the intermittent operation of the machine and for continuous operation to perform a complete operation at each position, each cam segment has a rise and a fall (as shown in Figs. 2, 3 and 5) depending on the amount of vertical feed needed at the respective working positions where they operate.

In Figs. 2 to 18, inclusive, the machine is illustrated equipped with tools for performing a variety of operations in sequence, for example, in the first operating position is a drill and counter bore 91, in the second a counter bore and facing tool 92, in the third a hollow mill 93, in the fourth an automatic cutting die head 94, and in the fifth a tapping head 95.

For returning the cutting jaws of the die head 94 after their automatic release on completing the cutting of each thread, there is provided a bifurcated lever 96, mounted on a bracket 97 clamped to the spindle housing and carrying rolls which are caused to press down on the top flange of the die head by the roller 98 on the other end of the lever being lifted by the cam 99 on the cam sleeve 100 fixed to the center hub of the work holder table when the latter is indexed.

A large variety of articles may be produced with great rapidity by running the machine continuously. Articles requiring a plurality of operations, if they are alike, may be completed in this manner at one revolution of the work holder table by mounting them in movable work holders.

The adjustment of the cutting speeds by the use of suitable spindle driving gears and idlers, and the vertical adjustment of the spindles and spindle head to suit the work and the tools used is done by substantially the same means for both continuous and intermittent operation; and likewise the fitting of cams having the proper contour for the work to be performed. The work is placed in the work holder chucks or vises while they are moving when the machine is operating continuously, and while they are stationary when the machine is operating intermittently. The operations performed by the machine upon the work are entirely automatic in both cases.

Referring to Fig. 1, the operative places the article to be machined in the open jaws of the chuck at the loading position (on the right of the figure) and when the work holder table moves first the chuck jaws close automatically and securely grasp the work and next the work holder roller rides up the cam incline and forces the work against the tool. This continues until the work holder nears the starting point, and during the last part of its movement around the center column it rides down the short decline of the cam and frees the work from the tool ready to be removed by the operator when the chuck jaws are opened upon completion of the movement of the work holder around the center column to the starting point, whereupon the finished work is removed and replaced by another blank.

*Operation of the machine.*

The intermittent or successive operation of the machine is illustrated in Figs. 19 to 25, inclusive, which show the successive stages in the production of a valve body or plug from a hexagon blank 121. The blank selected for illustration is inserted in the open work holder or chuck in the loading position A (see Figs. 1 and 14) during the short period that the work holder table is stationary. This period is long enough to permit removing the finished piece and inserting the blank, during which time the cams lift the work holders in the operating positions B, C, D, E and F, to complete the cuts or operations on preceding blanks at each position. The following indexing movement of the cam plate moves the work holder table one space to the right as shown in Fig. 2, carrying the selected blank to the first operating position (see Figs. 1 and 2) where it is drilled and counterbored by the tool 91 (see Fig. 20) upon the next reversal of the cam plate to the left. The next indexing movement carries the selected blank to the second operating position C (see Fig. 5) where it is counterbored and faced (see Fig.

Figure 22:
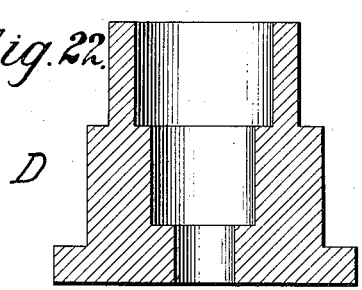
Figure 23:
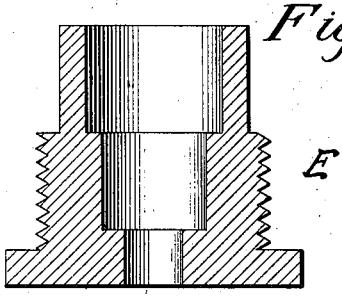
Figure 24:
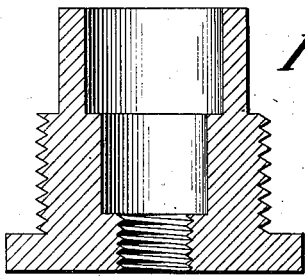
Figure 25:
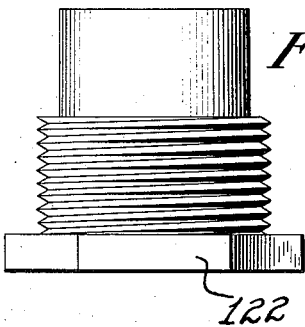

21) by the tool 92; and the machining is continued automatically in the same manner at the successive operating positions D, E and F (see Figs. 4, 5 and 2, respectively) by the hollow mill 93, automatic threading die 94, and automatic tapping head 95, respectively, forming and finishing the selected blank to the shapes shown in Figs. 22, 23 and 24. The finished plug 122 is shown in Figs. 24 and 25, and is removed by the operator at the loading position where the chuck is automatically opened by the cam 51, as shown in Figs. 3 and 4.

The machine is readily adapted to use various automatic tools for performing special operations and for handling special kinds of work, and the invention is not restricted to the details of construction and arrangement shown in the drawings, nor to the mode of operation thereof herein described.

In the claims the word "machine" is used to designate a drilling, boring, milling, die cutting or tapping machine having some or all of the characteristics herein described, or a machine analogous thereto.

I claim the following as my invention:

1. A multiple-spindle machine of the character described having a plurality of work holders and a spindle head, means for holding said head stationary or revolving it, and a work holder table adapted for intermittent or synchronous revolution with respect to said spindle head, in combination with means for rotating said spindles and simultaneously causing said work holders and spindles to approach and separate at predetermined points around the machine.

2. In combination with a rotatable work holder table, a plurality of work holders carried thereby and arranged for movement in relation thereto, a cam plate arranged for oscillatory movement with reference to said work holder table, connections between said cam plate and work holder table for moving said table at each oscillation of said cam plate in one direction, and a series of cams carried by said cam plate for moving said work holders at each oscillation of said cam plate in the opposite direction.

3. In combination with a rotatable work holder table, a plurality of work holders carried thereby and arranged for movement in relation thereto, a cam plate arranged for oscillatory movement with reference to said work holder table, connections between said cam plate and work holder table for moving said table at each oscillation of said cam plate in one direction, and a series of removable cams carried by said cam plate for moving said work holders independently at each oscillation of said cam plate in the opposite direction.

4. In a multiple spindle machine, tool spindles, a rotatable support, a plurality of movable work holders associated therewith, oscillating means for moving said work holders axially into operative relation with the spindles, said oscillating means also having provision for rotating said support to bring said work holders successively into operative relation with each spindle.

5. In a multiple spindle machine, tool spindles, a rotatable support, a plurality of axially movable work holders carried by the support, an oscillatable cam for each spindle arranged to move the work holders independently of each other and of the support to bring the work into operative position, and means to rotate the support to bring the work holders successively into working alignment with the spindles.

6. In a multiple spindle machine, a rotatable work holder support, a plurality of work holding chucks thereon, a plurality of spindles mounted in working alignment with said chucks, said chucks and spindles being mounted for relative axial movements independently of the support, oscillating cam mechanism arranged to produce such movements periodically, and means associated with said cam mechanism for rotating said work support to bring the chucks successively into working alignment with the spindles.

7. In a machine of the character decribed having a revolving work table and a spindle head having a plurality of tool spindles mounted for revolution around a central column, the combination of means for securing said spindle head in fixed position and means for securing said spindle head to revolve in synchronism with said work table, with means for locking said work table intermittently and means for rendering said locking means inoperative to permit continuous revolution thereof and changeable gearing for rotating said spindle head and work table.

8. In a machine of the character described having a revolving work table and a spindle head having a plurality of tool spindles mounted for revolution around a central column, the combination of means for securing said spindle head in fixed position, with means for locking said work table intermittently and means for rendering said locking means inoperative to permit revolution thereof, and changeable gearing for rotating said spindle head and revolving work table.

9. In a machine of the character described having a revolving work table and a spindle head having a plurality of tool spindles mounted for revolution around a central column, the combination of means for securing said spindle head in fixed position, with means for locking said work table intermittently and means for rendering said locking means inoperative to permit revolution thereof, and changeable gearing for rotating said spindle head and work table, said gearing permitting adjustment of said spindles towards and from said work table.

10. In a machine of the character described a stationary center column, a tool spindle head and a work holder table mounted on separate sleeves journaled on said column, means for adjusting said sleeves axially of said column with respect to each other, and means for causing one of said sleeves to remain stationary or to rotate with said other sleeve.

11. In a machine of the character described a stationary center column, a tool spindle head and a work holder table mounted on separate sleeves journaled on said column, an intermediate sleeve splined to one of said sleeves and having a detachable connection for securing it to the other of said sleeves, and means for causing one of said sleeves to rotate at a predetermined continuous speed, in combination with means for intermittently rotating said other sleeve independently of said first sleeve whereby said machine may be operated either continuously or intermittently, as desired.

12. A machine of the character described having a revolving work table provided with a plurality of work holders, the work holders being movable relatively to said table responsive to cam engaging means carried thereby, locking means for said table, a series of cams mounted for oscillation adjacent to said work table to move said work holders, said cams being removably secured to a pivoted carrier, means on said cam carrier for unlocking said table and for engaging said table to revolve it in one direction of movement, and reversible driving means for said carrier.

13. A machine of the character described having a revolving work table provided with a plurality of work holders, the work holders being movable relatively to said table responsive to cam engaging means carried thereby, a series of cams mounted for oscillation adjacent to said work table to move said work holders, said cams being removably secured to a pivoted carrier, means on said cam carrier for engaging said table to revolve it in one direction of movement, and reversible driving means for said carrier operated by clutches controlled by movement of said carrier.

14. In combination with a revolving work table and means for causing intermittent movement around its axis, fixed index member having a socket, a series of index pins carried by said table and adapted to engage said socket, a movable pin in said socket for ejecting said index pins, and means for holding said movable pin in ejecting position for preventing said index pins from entering said socket.

15. In combination with a revolving work table and means for causing intermittent movement around its axis, fixed index member having a socket, a series of index pins carried by said table and adapted to engage said socket, a movable pin in said socket for ejecting said index pins, and an operating member having means for holding said movable pin in ejecting position for preventing said index pins from entering said socket, said operating member also having means for periodically engaging said work table to move it intermittently whereby it is locked in successive working positions by the index pins.

16. In combination with a revolving work table and means for causing intermittent movement around its axis, fixed index member having a socket, a series of index pins carried by said table and adapted to engage said socket, a movable pin in said socket for ejecting said index pins, and an operating member having a spring pressed catch for engaging said work table to turn it in one direction and a cam to engage said ejecting pin to release said table for turning movement.

In testimony whereof, I have signed my name to this specification.

CALVIN JACKSON.